(12) United States Patent
Nishida et al.

(10) Patent No.: US 9,665,727 B2
(45) Date of Patent: May 30, 2017

(54) INFORMATION PROCESSING SYSTEM, METHOD OF PROCESSING INFORMATION, PROGRAM, AND RECORDING MEDIUM

(71) Applicants: Takayori Nishida, Tokyo (JP); Yuki Suzumoto, Kanagawa (JP)

(72) Inventors: Takayori Nishida, Tokyo (JP); Yuki Suzumoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 45 days.

(21) Appl. No.: 14/329,061

(22) Filed: Jul. 11, 2014

(65) Prior Publication Data

US 2015/0033293 A1 Jan. 29, 2015

(30) Foreign Application Priority Data

Jul. 24, 2013 (JP) ................................ 2013-153546

(51) Int. Cl.
*H04L 29/06* (2006.01)
*G06F 21/60* (2013.01)

(52) U.S. Cl.
CPC .......... *G06F 21/608* (2013.01); *G06F 21/606* (2013.01)

(58) Field of Classification Search
CPC .................................................... G06F 21/608
USPC ............................................................ 726/4
See application file for complete search history.

(56) References Cited

U.S. PATENT DOCUMENTS

| 5,978,836 | A * | 11/1999 | Ouchi | G06Q 10/10 |
| | | | | 709/203 |
| 7,366,758 | B2 * | 4/2008 | Kasatani | 709/206 |
| 7,600,119 | B2 * | 10/2009 | Takano | H04L 67/12 |
| | | | | 713/168 |
| 8,629,999 | B2 | 1/2014 | Nishida | |
| 8,760,729 | B2 | 6/2014 | Oseto et al. | |
| 9,141,941 | B2 * | 9/2015 | Hashimoto | G06F 21/606 |
| 2008/0168542 | A1 * | 7/2008 | Sato | 726/5 |
| 2009/0143910 | A1 * | 6/2009 | Seo | B41J 13/106 |
| | | | | 700/245 |

(Continued)

FOREIGN PATENT DOCUMENTS

| JP | 2001-051915 | 2/2001 |
| JP | 2004-236348 | 8/2004 |

(Continued)

*Primary Examiner* — Longbit Chai
(74) *Attorney, Agent, or Firm* — IPUSA, PLLC

(57) ABSTRACT

An information processing system including at least one computer and connected to an apparatus through a network includes a receiving unit that receives a request in which address information related to data is designated to a predetermined destination; a generating unit that generates authority identifying information for identifying operation authority of the apparatus in response to the request; a first memory unit that stores the authority identifying information and the address information by associating the authority identifying information with the address information; and a sending unit that sends the authority identifying information to a transmission source of the request, wherein the apparatus performs a process using the data related to the address information stored in the first memory unit in association with the authority identifying information when the authority identifying information is input.

16 Claims, 10 Drawing Sheets

19

| USER NAME | PIN CODE | MAIL ADDRESS | ACCESS DESTINATION INFORMATION |
|---|---|---|---|
| A | | aaa@xxxxx | .... |
| B | F93 | bbb@xxxxx | ... |
| : | : | : | : |

(56) References Cited

U.S. PATENT DOCUMENTS

2013/0263173 A1* 10/2013 McCoy ............ H04N 21/25891
  725/27
2013/0329245 A1   12/2013 Nishida

FOREIGN PATENT DOCUMENTS

| JP | 2012-248006 | 12/2012 |
| JP | 2014-016979 | 1/2014 |

* cited by examiner

FIG.6

| USER NAME | PASSWORD | MAIL ADDRESS | ..... |
|---|---|---|---|
| A | ..... | aaa@xxxxx | ..... |
| B | ..... | bbb@xxxxx | ..... |
| .. | .. | .. | .. |

| USER NAME | PIN CODE | MAIL ADDRESS | ACCESS DESTINATION INFORMATION |
|---|---|---|---|
| A | | aaa@xxxxx | ..... |
| B | F93 | bbb@xxxxx | ..... |
| .. | .. | .. | .. |

19

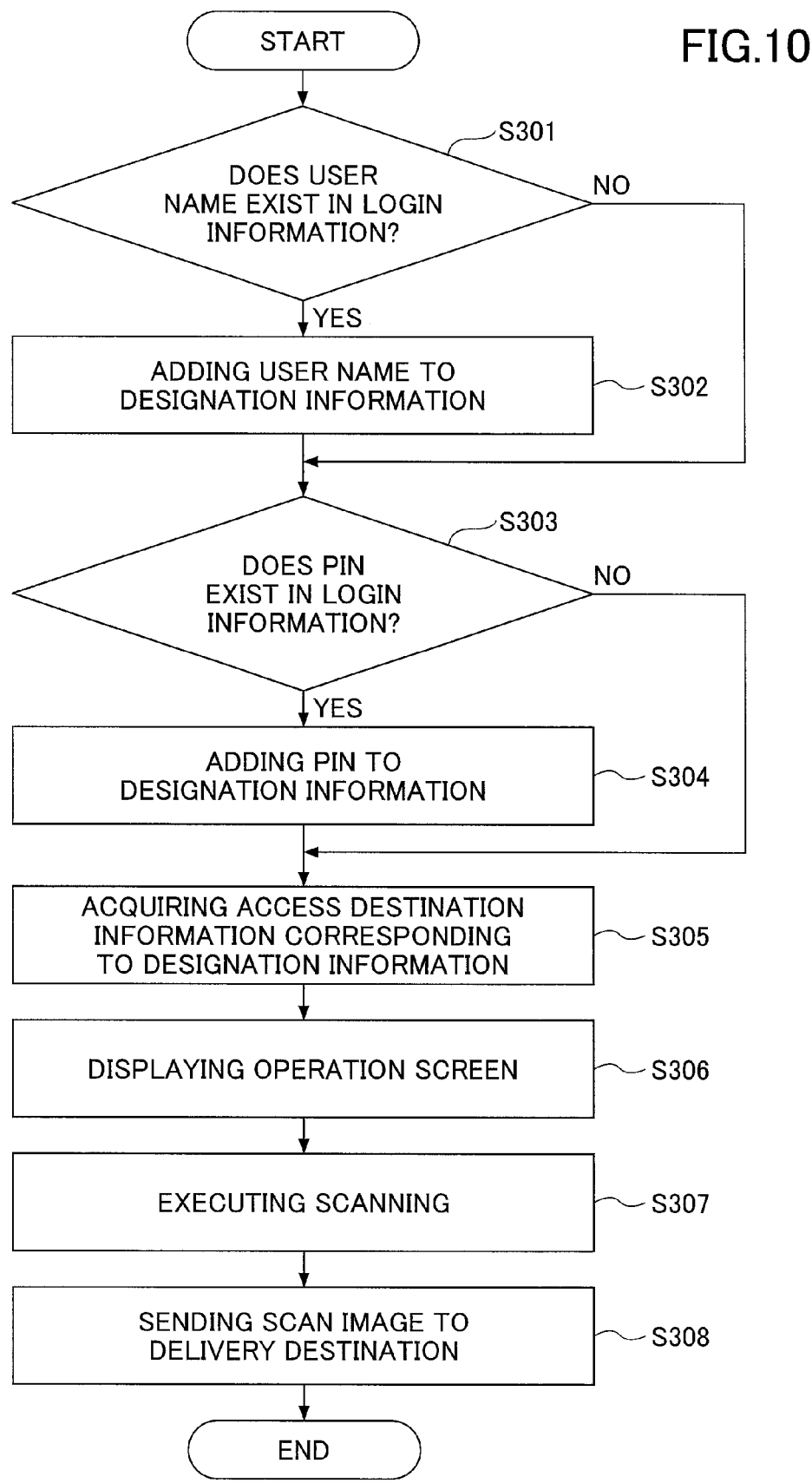

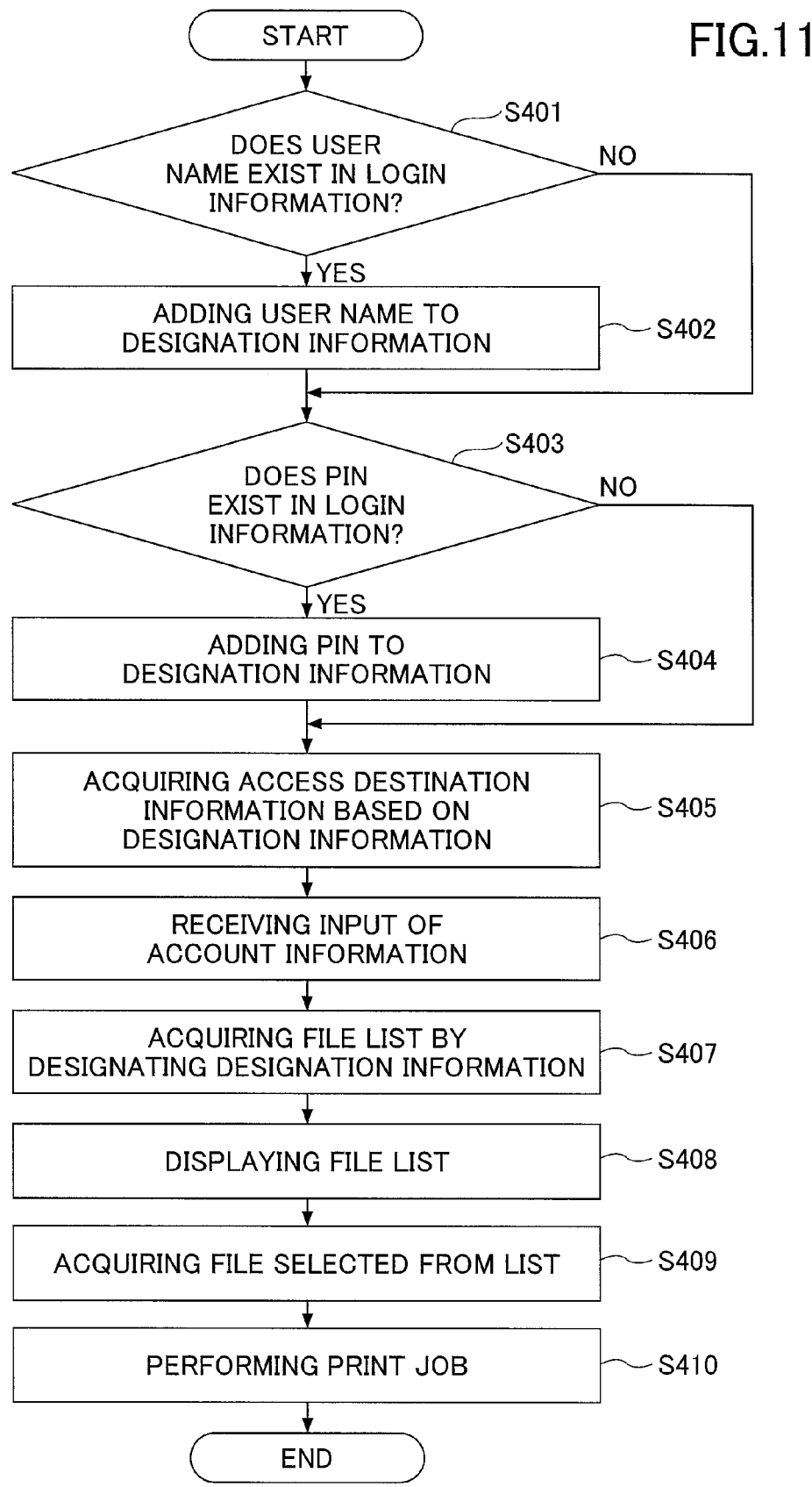

INFORMATION PROCESSING SYSTEM, METHOD OF PROCESSING INFORMATION, PROGRAM, AND RECORDING MEDIUM

BACKGROUND OF THE INVENTION

1. Field of the Invention

The present invention generally relates to an information processing system, a method of processing information, a program, and a recording medium.

2. Description of the Related Art

Some of image forming apparatuses such as a printer or a multifunction peripheral which are installed in an office or the like are set so as to be permitted to be used by only a user whom an operation authority is previously given. Specifically, there is an image forming apparatus which is permitted to be used by only a user whose account corresponding to the operation authority has been registered and who has been authenticated based on the account as in Patent Documents 1 and 2.

However, it is difficult for a guest user who does not previously have the account such as a visitor to an office or the like to use the above image forming apparatus. For example, an account for the guest may be prepared so that each guest user logs in using a common guest account. However, in this case, it is difficult to ensure security among the guest users.

Patent Document 1: Japanese Laid-Open Patent Application No. 2004-236348

Patent Document 2: Japanese Laid-Open Patent Application No. 2001-051915

SUMMARY OF THE INVENTION

Accordingly, embodiments of the present invention provide a novel and useful information processing system, a method of processing information, a program, and a recording medium solving one or more of the problems discussed above.

One aspect of the embodiments of the present invention may be to provide an information processing system including at least one computer and connected to an apparatus through a network including a receiving unit that receives a request in which address information related to data is designated to a predetermined destination; a generating unit that generates authority identifying information for identifying operation authority of the apparatus in response to the request; a first memory unit that stores the authority identifying information and the address information by associating the authority identifying information with the address information; and a sending unit that sends the authority identifying information to a transmission source of the request, wherein the apparatus performs a process using the data related to the address information stored in the first memory unit in association with the authority identifying information when the authority identifying information is input.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 6 illustrates an exemplary structure of a user information memory unit.

FIG. 7 illustrates a structural example of a user data memory unit.

FIG. 10 is a flowchart for explaining an exemplary procedure of an execution process of a scanning delivery job.

FIG. 11 is a flowchart for explaining an exemplary procedure of an execution process of a print job.

DETAILED DESCRIPTION OF THE PREFERRED EMBODIMENTS

A description is given below, with reference to the FIG. 1 through FIG. 11 of embodiments of the present invention. Where the same reference symbols are attached to the same parts, repeated description of the parts is omitted.

Reference symbols typically designate as follows:
1: information processing system;
10: management server;
11: mail receiving unit;
12: address confirming unit;
13: PIN code generating unit;
14: access destination registering unit;
15: response mail generating unit;
16: mail returning unit;
19: access destination memory unit;
20: image forming apparatus;
21: controller;
22: scanner;
23: printer;
24: modem;
25: operation panel;
26: network interface;
27: SD card slot;
30: user terminal;
31: web browser;
32: mail sending unit;
40: mail server;
50: authentication server;
51: request responding unit;
52: user information memory unit;
60: online storage system;

80: SD card;
100: drive device;
101: recording medium;
102: auxiliary memory device;
103: memory device;
104: CPU;
105: interface device;
211: CPU;
212: RAM;
213: ROM;
214: HDD;
215: NVRAM;
221: authentication controlling unit;
222: access destination acquiring unit;
223: print object acquiring unit;
224: print controlling unit;
225: scanning delivery controlling unit; and
B: bus.

Figure 1:
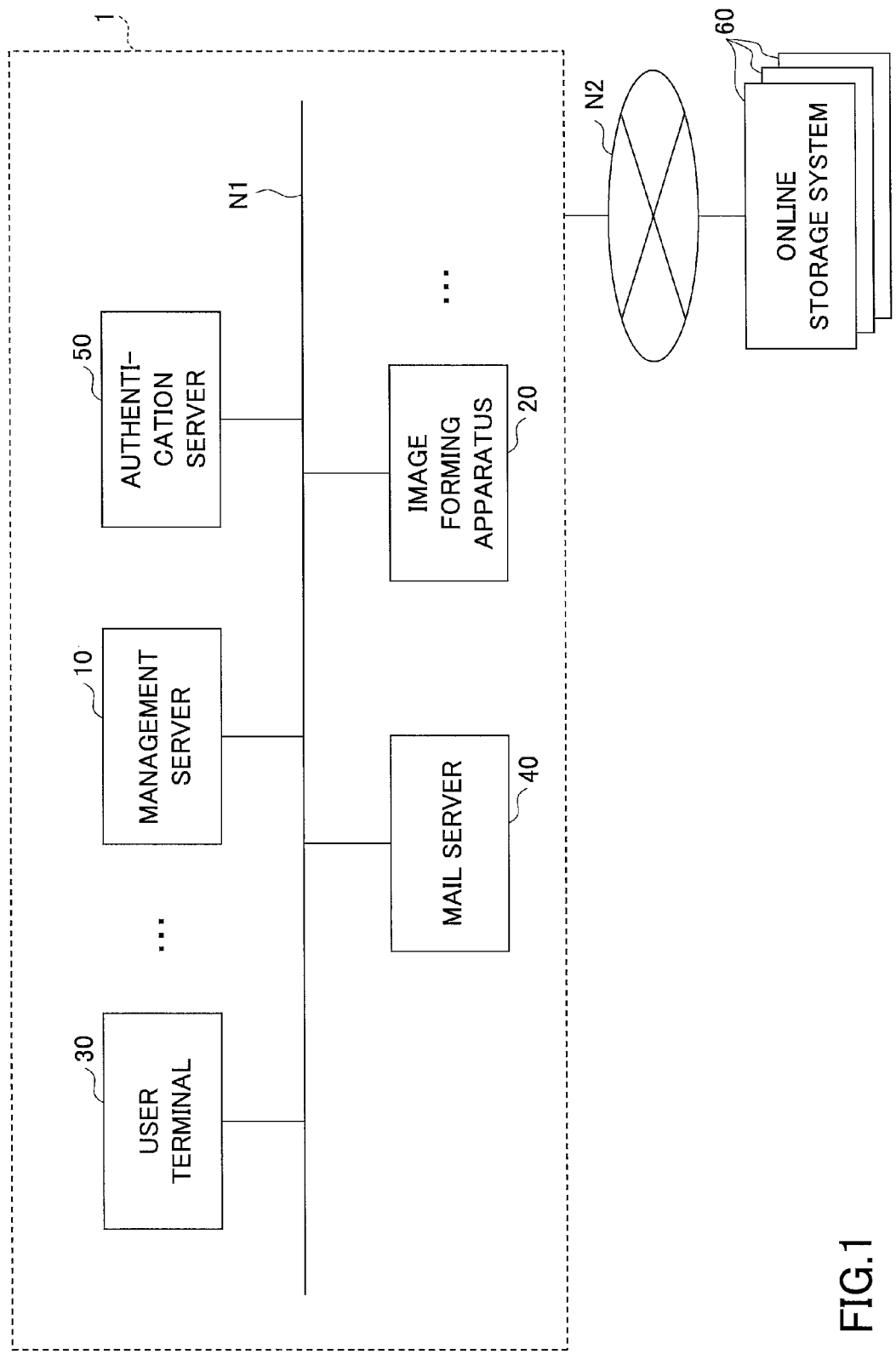
FIG. 1 illustrates an exemplary structure of an information processing system of an embodiment.

Hereinafter, an embodiment of the present invention is described based on the figures. FIG. 1 illustrates an exemplary structure of an information processing system of the embodiment. In the information processing system 1 illustrated in FIG. 1, at least one user terminal 30, a mail server 40, a management server 10, an authentication server 50, and at least one image forming apparatus 20 are connected through a network N1 such as a Local Area Network (LAN) or the Internet. A part or all of the network N1 may be a wireless communication network. A mobile communication network may intervene between the user terminal 30 and the network N1. The information processing system 1 is operated in a certain organization in a business enterprise or the like. Within the embodiment of the present invention, the organization is referred to as "a company A".

The user terminal 30 is an information processing apparatus directly operated by a user of the information processing system 1. For example, the user operates the user terminal 30 to cause the information processing system 1 to receive a print request. An example of the user terminal 30 is a personal computer (PC), a mobile phone, a smart phone, a tablet-type terminal, a personal digital assistance (PDA), or the like. Each of multiple user terminals 30 may be different models.

In the embodiment, users of the information processing system 1 are distinguished between an "authenticated user" and a "guest user". Operation authority of operating the image forming apparatus 20 is previously given to the authenticated user. Said differently, the authenticated user is planned as a user of the information processing system 1. An exemplary authenticated user is an employee of the company A. The operation authority of the image forming apparatus 20 is not given to the guest user. An exemplary guest user is a visitor to the company A or a person other than an employee of the company A. In the information processing system 1, the distinction between the authenticated user and the guest user is performed based on whether an account corresponding to the operation authority of the image forming apparatus 20 is registered in the information processing system 1 (specifically, in a user information memory unit 52 described below). Further, the user terminal 30 may be an information processing apparatus which is personally owned by the authenticated user or the guest user.

The mail server 40 is a computer which transfers an email sent from the user terminal 30 or an email or the like sent from the management server 10. For example, in response to an instruction of the user, the user terminal 30 sends the email (hereinafter, referred to as an "access destination register mail") indicative of a register request of registering a folder or a file stored in an online storage system 60, which is an access destination for the image forming apparatus 20 when the image forming apparatus 20 performs a job, to a predetermined address. In the register of the access destination, the folder or the file to be accessed in the print job or the scanning job is previously registered before the print job, the scanning delivery job, or the like is caused to be performed by the image forming apparatus 20. Said differently, the folder or the file as the access destination is a folder in which a file to be printed is stored in the print job performed by the image forming apparatus 20 or the file to be printed, respectively. Alternatively, the folder as the access destination is a folder as a delivery destination of image data scanned in the scanning delivery job which is performed by the image forming apparatus. For example, inside a subject (a title) of the access destination register mail, address information (for example, a uniform resource locator (URL)) of the folder or the file as the access destination is described in a predetermined format. The address information specifying the folder or the file in the network may be other than URL. Further, a major URL may be associated with a keyword. In this case, the management server 10 may manage corresponding information between the URLs and the keywords. With this, the user can designate simple keywords in the access destination register mail instead of complicated URLs. Hereinafter, information for specifying the folder or the file is referred to as "access destination information".

Meanwhile, the guest user does not have an operation authority to use the image forming apparatus 20. Therefore, the guest user cannot log into the image forming apparatus 20. Then, even if the guest user can send an access destination register mail and the access destination information can be registered, a job using the access destination is not performed by the image forming apparatus 20.

Therefore, within the embodiment, a temporary and pseudo identification information of the operation authority is generated to temporarily enable to use the image forming apparatus 20 in response to the access destination register mail sent by the guest user. Within the embodiment, the identification information is referred to as a personal identification number (PIN) code (a personal secret identification code). The generated PIN code is returned to a transmission source address of the access destination register mail. As a result, the guest user can acquire a pseudo account The authentication server 50 is a computer for managing information (hereinafter, referred to as "user information") including the user name, the password, and the mail address of each authenticated user. For example, the authentication server 50 performs an authentication process in receipt of an authentication request, where the user name, the password, or the like is designated. Further, the authentication server 50 performs processes corresponding to an existence confirming request of confirming the existence of the mail address and an acquisition request of requesting the user name corresponding to the mail address.

The management server 10 is a computer which registers the access destination information designated in the mail or issues the PIN code in response to a receipt of the access destination register mail or a computer system that includes at least one of the above computer. In a case where the transmission source address of the access destination register mail is associated with the user name and managed by the authentication server 50, the access destination information is associated with the user name. In a case where the transmission source address of the access destination register mail is not managed by the authentication server 50 in association with the user name, the management server 10 issues a PIN code. In a case where the PIN code is issued, the access destination information designated by the mail is associated with the PIN code instead of the user name.

The image forming apparatus 20 performs a job related to scanning, copying, printing, or sending and receiving a facsimile. Even if any one of these jobs cannot be performed by an apparatus, this apparatus may be used as the image forming apparatus 20. The image forming apparatus 20 performs a job requested by the user in a case where the authentication based on the user name and the password input by the user or the PIN code input by the user is successful.

The information processing system 1 is connected with the online storage system 60 through a wide area network N2 such as the Internet. The online storage system 60 is a computer system providing a cloud service called an "online storage" through the network. The online storage is a service of lending a memory area of a storage. Within the embodiment, the online storage system 60 is used as an input source of data to be printed by the image forming apparatus 20, a delivery destination (a storage destination) of image data input by the image forming apparatus 20 and obtained by scanning an original (hereinafter, an original), or the like.

The management server 10 and the authentication server 50 may be structured by one server or multiple servers. The number of the multiple servers may be appropriately determined according to an operation.

Figure 2:
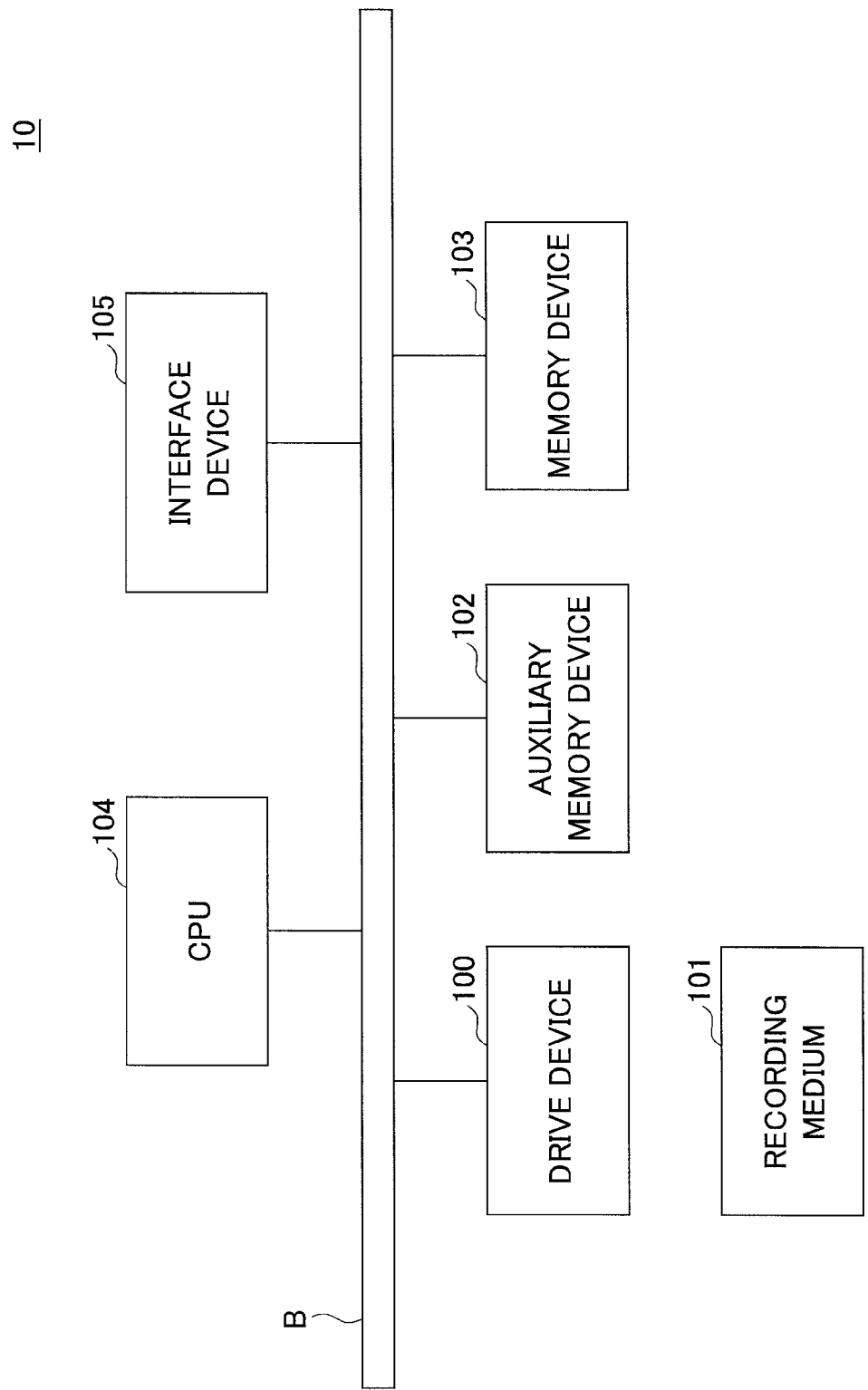
FIG. 2 illustrates an exemplary hardware configuration of a management server according to the embodiment of the present invention.

FIG. 2 illustrates an exemplary hardware configuration of the management server according to the embodiment of the present invention. The management server 10 illustrated in FIG. 2 includes a drive device 100, an auxiliary memory device 102, a memory device 103, a CPU 104, and an interface device 105, or the like, which are mutually connected by a bus B.

A program substantializing processes in the management server 10 is supplied by a recording medium 101 such as a CD-ROM. When the recording medium 101 with the program recorded on it is installed in the drive device 100, the program is installed on the auxiliary memory device 102 through the drive device 100 from the recording medium 101. However, the program may not always be installed from the recording medium 101 and may be downloaded from another computer through the network. The auxiliary memory device 102 stores necessary files, data, and so on in addition to the installed program.

The memory device 103 reads out the program from the auxiliary memory device 102 when the program is instructed to be invoked and stores the read program into the memory device 103. The CPU 104 performs a function related to the management server 10 in conformity with the program stored in the memory device 103. The interface device 105 is used as an interface for connecting to the network.

Figure 3:
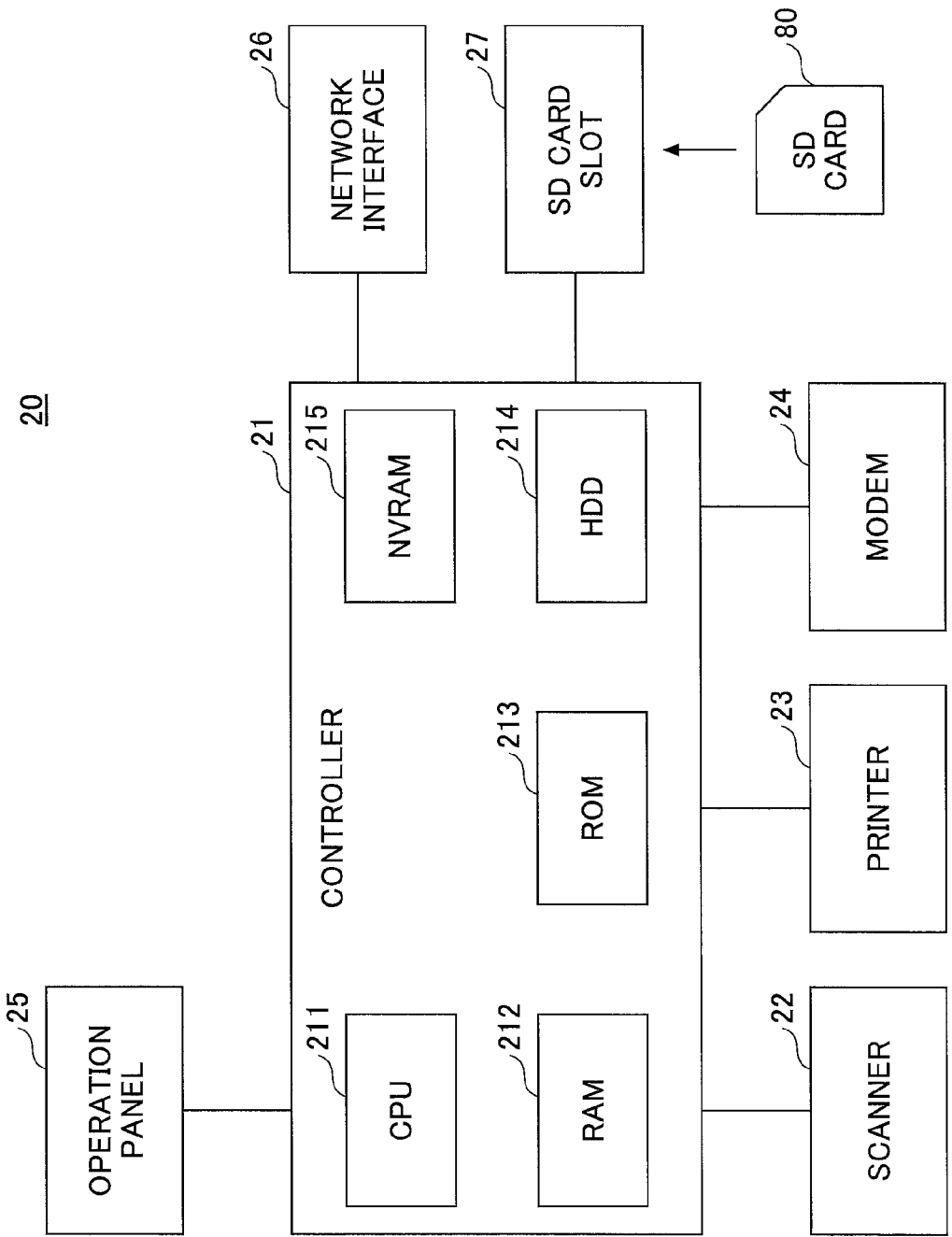
FIG. 3 illustrates an exemplary hardware configuration of an image forming apparatus of the embodiment of the present invention.

FIG. 3 illustrates an exemplary hardware configuration of the image forming apparatus 20 of the embodiment. Referring to FIG. 3, the image forming apparatus 20 includes hardware such as a controller 21, a scanner 22, a printer 23, a modem 24, an operation panel 25, a network interface 26, an SD card slot 27, and so on.

The controller 21 includes a CPU 211, a RAM 212, a ROM 213, an HDD 214, an NVRAM 215, and so on. Various programs and data used by the programs are stored in the ROM 213. The RAM 212 is used as a memory area for loading the programs, a work area for the loaded programs, or the like. The CPU 211 performs various functions by processing the program loaded into the RAM 212. The HDD 214 stores programs, various data used by the programs, or the like. The NVRAM 215 stores various setup information or the like.

The scanner 22 is hardware (an image reading unit) for reading image data from the original. The printer 23 is hardware (a printing unit) for printing print data on a print paper. The modem 24 is hardware for connecting the image forming apparatus 20 to a telecommunication line (not illustrated) and is used for sending and receiving the image data with fax communications. The operation panel 25 is hardware provided with an input unit for receiving an input from the user such as a button, a display unit such as a liquid crystal panel, or the like. The liquid crystal panel may have a touch panel function. In this case, the liquid crystal panel may also have the function of the input unit. The network interface 26 is hardware for connecting the image forming apparatus 20 to a wired or wireless network such as LAN. The SD card slot 27 is used to read a program stored in the SD card 80. Said differently, not only the programs stored in the ROM 213 but also the programs stored in the SD card 80 may be loaded into the RAM 212 and executed by the image forming apparatus 20. The SD card 80 may be replaced by another recording medium such as a CD-ROM and a universal serial bus (USB) memory. The type of the recording medium such as the SD card 80 is not specifically limited to a predetermined kind. In this case, the SD card slot 27 may be replaced by hardware depending on kinds of the recording medium.

Figure 4:
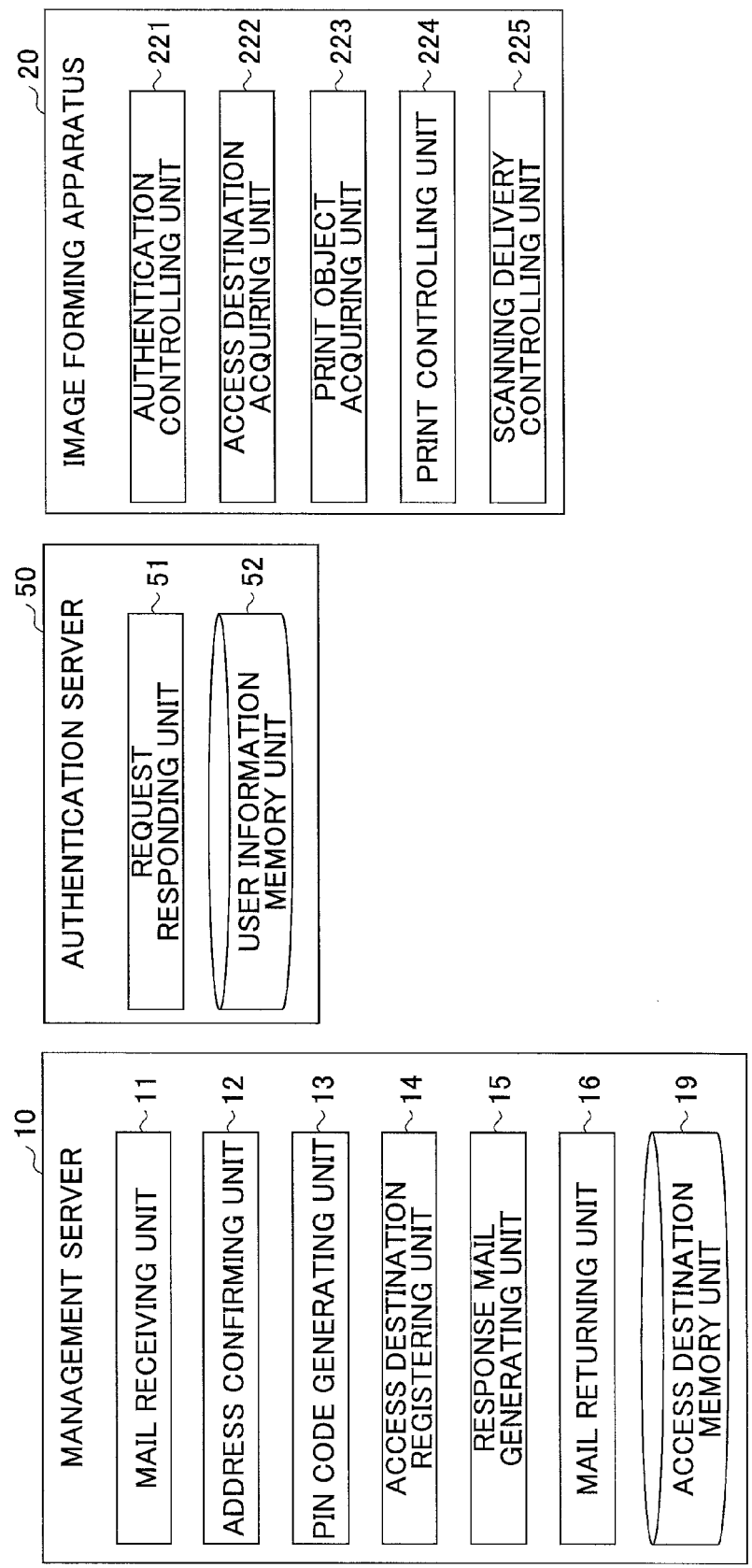
FIG. 4 illustrating an exemplary functional structure of the information processing system of the embodiment of the present invention.

FIG. 4 illustrates an exemplary functional structure of the information processing system of the embodiment. Referring to FIG. 4, the management server 10 includes a mail receiving unit 11, an address confirming unit 12, a PIN code generating unit 13, an access destination registering unit 14, a response mail generating unit 15, a mail returning unit 16, and so on. These units are substantialized when one or more programs installed in the management server 10 are executed by the CPU 104.

The management server 10 uses an access destination memory unit 19. The access destination memory unit 19 can be substantialized by the auxiliary memory device 102, a memory device or the like connected to the management server 10 through the network.

The mail receiving unit 11 receives an access destination register mail from the mail server 40. The destination address of the access destination register mail is predetermined. Therefore, the mail receiving unit 11 receives an email sent to a predetermined address as the access destination register mail.

It is necessary that the access destination register mail sent by the guest user include a mail address (hereinafter, an "authenticated address") that relates to any one of authenticated users and is stored in the user information memory unit 52. For example, the authenticated address may be reported to the guest user by the authenticated user who has permitted the guest user to use the image forming apparatus 20. For example, the authenticated address may be designated as the Carbon copy (Cc) address or the Bcc address of the access destination register mail or may be included in the title (the reference) or the body of the access destination register mail.

The address confirming unit 12 sends an existence confirming request of requesting to confirm whether the transmission source address of the access destination register mail exists or whether the authenticated address included in the transmission source address exists to the authentication server 50. As a result, it is possible to check whether the transmission source address or the authenticated address is registered in the authentication server 50. The address confirming unit 12 acquires the user name corresponding to the address to be confirmed from the authentication server 50 in a case where the address to be confirmed is registered in the authentication server 50.

The PIN code generating unit 13 generates a PIN code in a case where operation authority for operating the image forming apparatus 20 is permitted to be given to the sender of the access destination register mail. However, the PIN code is not generated for the access destination register mail if the transmission source address of which is the authenticated address. This is because the sender of the access destination register mail is the authenticated user and always has the operation authority for the image forming apparatus 20.

The access destination registering unit 14 acquires access destination information from the access destination register mail, and stores the acquired access destination information in the access destination memory unit 19 while associating the acquired access destination information with the user name of the authenticated user, the PIN code generated for the guest user, or the like.

The response mail generating unit 15 generates an email (hereinafter, a "response mail") as a response to the access destination register mail. In a case where the PIN code is issued in response to the access destination register mail, the response mail includes the PIN code.

The mail returning unit 16 returns the response mail to the transmission source address of the access destination register mail.

The authentication server 50 includes a request responding unit 51, a user information memory unit 52, and so on. The user information memory unit 52 stores user information for each authenticated user. The request responding unit 51 performs a process corresponding to the authentication request, the existence confirming request of confirming the existence of the mail address, the acquisition request of acquiring the user name corresponding to the mail address, or the like. The request responding unit 51 is substantialized by a process of a program which is installed in the authentication server 50 and performed by the CPU of the authentication server 50. The user information memory unit 52 is substantialized by an auxiliary memory device of the authentication server 50, a memory device connected to the authentication server 50 through the network, or the like.

The image forming apparatus 20 includes an authentication controlling unit 221, an access destination acquiring unit 222, a print object acquiring unit 223, a print controlling unit 224, a scanning delivery controlling unit 225, or the like. These units are substantialized when one or more programs installed in the image forming apparatus 20 are executed by the CPU 211. The authentication controlling unit 221 receives an input of the user name and the password, or the PIN code from the user. In a case where the user name and the password are input, the authentication controlling unit 221 requests the authentication server 50 to authenticate the user name and the password. In a case where the PIN code is input, the authentication controlling unit 221 checks whether the PIN code is stored in the access destination memory unit 19. The access destination acquiring unit 222 acquires the access destination information stored in the access destination memory unit 19 in association with the user name of the login user or the PIN code. The print object acquiring unit 223 acquires a file inside a folder related to the access destination information acquired by the access destination acquiring unit or a file related to the access destination information as data to be printed. The print controlling unit 224 controls a print job related to data acquired by the print object acquiring unit 223. The scanning delivery controlling unit 225 controls a scanning delivery job. The scanning delivery job is a job delivering or storing image data input by the image forming apparatus 20 (said differently, image data obtained by reading the original, hereinafter, referred to as a "scanned image") into a predetermined storage, a predetermined user terminal, or the like.

Figure 5:
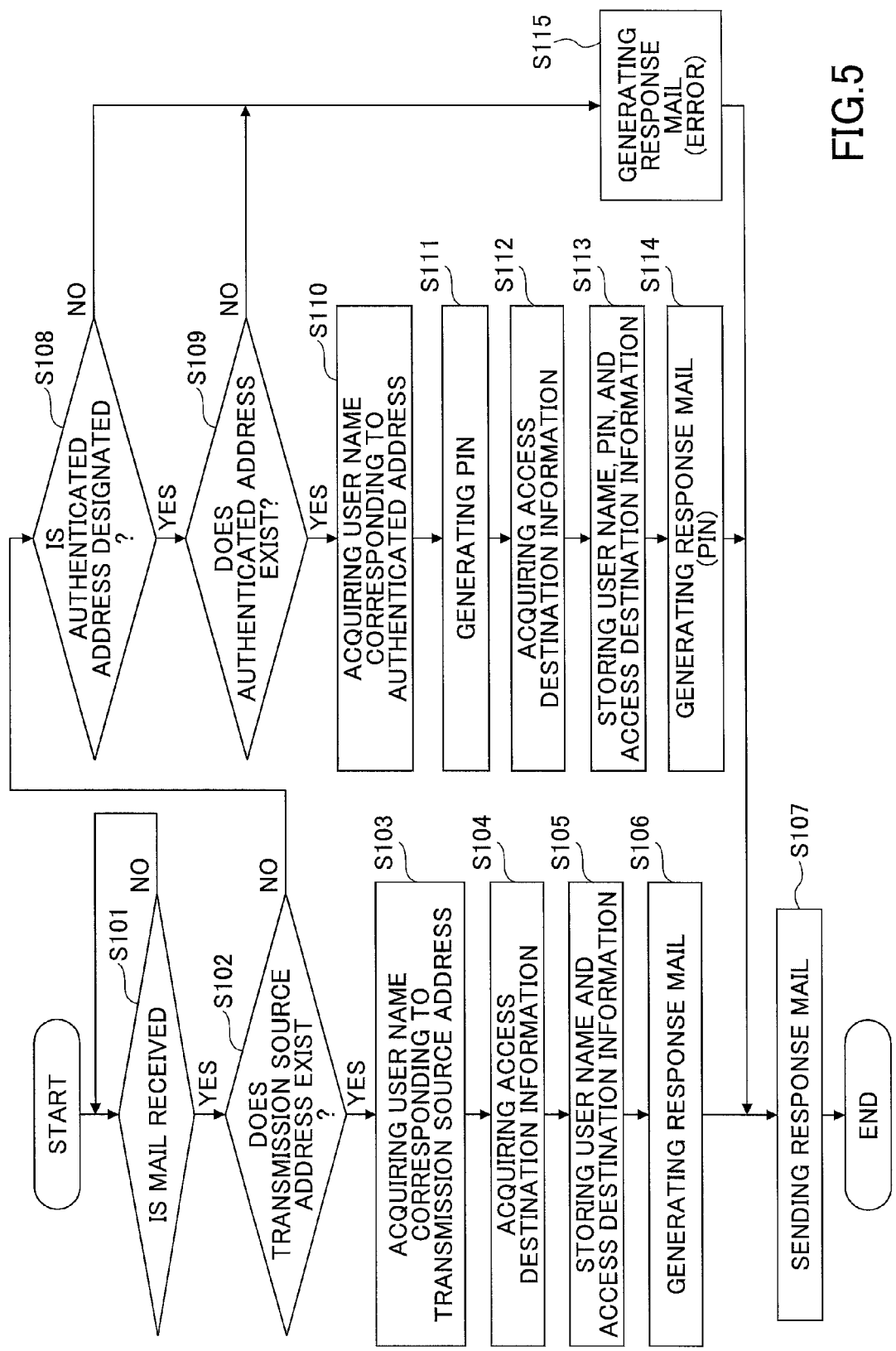
FIG. 5 is a flowchart for explaining an exemplary procedure performed by the management server in response of a receipt of a mail.

Hereinafter, the procedure performed by the information processing system 1 is described. FIG. 5 is a flowchart of an exemplary procedure performed by the management server in response of a receipt of the mail.

The authenticated user or the guest user sends the access destination register mail from, for example, their own user terminal 30. A URL indicative of a file, a folder, or the like which is required to be printed by the user or to which the scanned image is delivered as the delivery destination by the user is designated in the access destination register mail.

The mail receiving unit 11 of the management server 10 waits a receipt of an access destination register mail (S101). For example, the mail receiving unit 11 monitors a receipt of an email to a predetermined address by polling or the like. When the corresponding email is received by the mail server 40 and the email is acquired by the mail receiving unit 11 (YES in S101), the address confirming unit 12 sends the existence confirming request of confirming the existence of a transmission source address of the email to the authentication server 50 to confirm the existence of the transmission source address (S102). The request responding unit 51 of the authentication server 50 confirms whether the mail address designated in the existence confirming request is included the mail address in any of the user information which is stored in the user information memory unit 52.

FIG. 6 illustrates an exemplary structure of the user information memory unit 52. Referring to FIG. 6, the user information memory unit 52 stores user information for each authenticated user. The user information includes, for example, a user name, a password, a mail address (an authenticated address), or the like. Multiple authenticated addresses for a personal computer (PC), a portable terminal, or the like may be registered for one user.

The request responding unit 51 returns a response including the result of the confirmation to the management server 10. The result of the confirmation indicates whether the transmission source address exists.

In a case where the result of the confirmation indicates that the transmission source address exists (YES in S102), the address confirming unit 12 acquires the user name corresponding to the transmission source address of the email from the authentication server 50 (S103). Said differently, in the user information memory unit 52, the user name associated with the transmission source address is acquired.

Subsequently, the access destination registering unit 14 acquires the access destination information from the email (S104). Subsequently, the access destination registering unit 14 stores the acquired access designation information in the access destination memory unit in association with the user name acquired in step S103, the transmission source address of the access destination register mail, and so on (S105).

FIG. 7 illustrates an exemplary structure of the access destination memory unit 19. Referring to FIG. 7, each record of the access destination memory unit 19 includes items such as the user name, the PIN code, the mail address, the access destination information, and so on. The user name of the authenticated user is stored in the item of the user name. In a case where the PIN code is generated, the generated PIN code is stored in the item of the PIN code. The transmission source address of the access destination register mail is stored in the item of the mail address. The access destination information acquired from the access destination register mail is stored in the item of the access destination information.

In step S105, because the record related to the access destination register mail from the authenticated user is registered, the user name of the authenticated user, the transmission source address of the mail, and the access destination information acquired from the mail are stored in the access destination memory unit 19 in association with one another. For example, referring to FIG. 7, the record whose user name is "A" is an example of a record stored in step S105. Said differently, because the PIN code is not generated for the authenticated user, the PIN code is not stored.

Subsequently, the response mail generating unit 15 generates a response mail including a message or the like indicative of a receipt of the register of the access destination information (S106). The mail returning unit 16 sends the response mail to the transmission source address of the access destination register mail (S107). The user who browses the response mail can know that the access destination information is normally registered.

On the other hand, in step S102, in a case where the transmission source address does not exist, the address confirming unit 12 confirms whether the authenticated address is designated in the email (S108). For example, it is confirmed whether the authenticated address is designated in the Cc address, the Bcc address, the title, or the body. How to designate the authenticated address may be appropriately determined.

In a case where the authenticated address is designated in the email (YES of S108), the address confirming unit 12 confirms whether the authenticated address exists by a method similar to step S102 (S109). In a case where the authenticated address exists (YES of S109), the address confirming unit 12 acquires the user name of the authenticated user corresponding to the authenticated address by a method similar to step S103.

Subsequently, the PIN code generating unit 13 generates the PIN code (S111). This newly generated PIN code may be generated by any method as long as the newly generated PIN code has a value different from the already generated PIN code. However, the PIN code is preferably structured by characters, which can be easily input through the operation panel 25 of the image forming apparatus 20 or a software keyboard displayed on the operation panel 25. Here, the already issued PIN code is a PIN code stored as any record in the access designation memory unit 19.

Subsequently, the access destination registering unit 14 acquires the access destination information from the email by a method similar to step S104 (S112). Subsequently, the access destination registering unit 14 stores the acquired access designation information in the access destination memory unit 19 (FIG. 7) in association with the user name acquired in step S110, the PIN code generated in step S111, the transmission source address of the access destination register mail, and so on (S113). For example, referring to FIG. 7, the record whose user name is "B" is an example of a record stored in step S113.

Subsequently, the response mail generating unit 15 generates a response mail including a message or the like which indicates a receipt of the register of the access destination information and includes the generated PIN code (S114). In step S107, the response mail is sent to the transmission source address of the access destination register mail. The guest user who broeses (reads) the response mail can know the PIN code corresponding to the registered access destination information. Further, as described later, the guest user acquires the authority or the like for logging on the image forming apparatus 20.

Further, in a case where the authenticated address is not designated in the access destination register mail received from the guest user (NO of S108) or in a case where the mail address designated as the authenticated address is not the authenticated address (NO of S109), the response mail generating unit 15 generates, for example, a response mail (hereinafter, referred to as an "error mail") including an error message (S115). In this case, the error mail is sent in step S107.

The reason why it is necessary to designate the authenticated address to the email whose transmission source address is not the authenticated address is to prevent an unfair use of the image forming apparatus 20 by the guest user or to clarify the billing destination for a usage of the image forming apparatus 20 by the guest user. For example, when the authenticated address is designated to the Cc address or the Bcc address of the email whose transmission source address is not the authenticated address, the authenticated user can instantaneously know that the print request mail or the PIN request mail is sent by the guest user. Therefore, it is possible to detect generation of an unexpected access destination register mail which is not expected by the authenticated user. As a result, the unauthorized use caused by the guest user can be prevented. Further, the authenticated address may be designated in the destination address (To) instead of the Cc address or the Bcc address.

For example, in a case where it is required to designate the authenticated address in the title or the body, the management server 10 may transfer the access destination register mail to the authenticated address. With this, effects similar to the case where the Cc address or the Bcc address is designated are obtainable.

Because the authenticated address is designated to the email, whose transmission source address is not the authenticated address, it is possible to associate the PIN code issued based on the email with the authenticated user. Within the embodiment, the association between the PIN code and the authenticated user is held in the access destination memory unit 19. Based on the association between the PIN code and the authenticated user, the job performed by the image forming apparatus 20, which is logged in using the PIN code, can be caused to be associated with the authenticated user. Therefore, the authenticated user, who is the billing destination related to the job caused by the guest user to be performed by the image forming apparatus 20, can be specified.

However, the designation of the authenticated address may be exempted from the email received from the guest user in response to the required security or the like. In this case, steps S112 and S113 may not be performed.

Subsequently, a procedure of the image forming apparatus 20 performed in response to an operation of the image forming apparatus 20 by an user is described.

Figure 8:
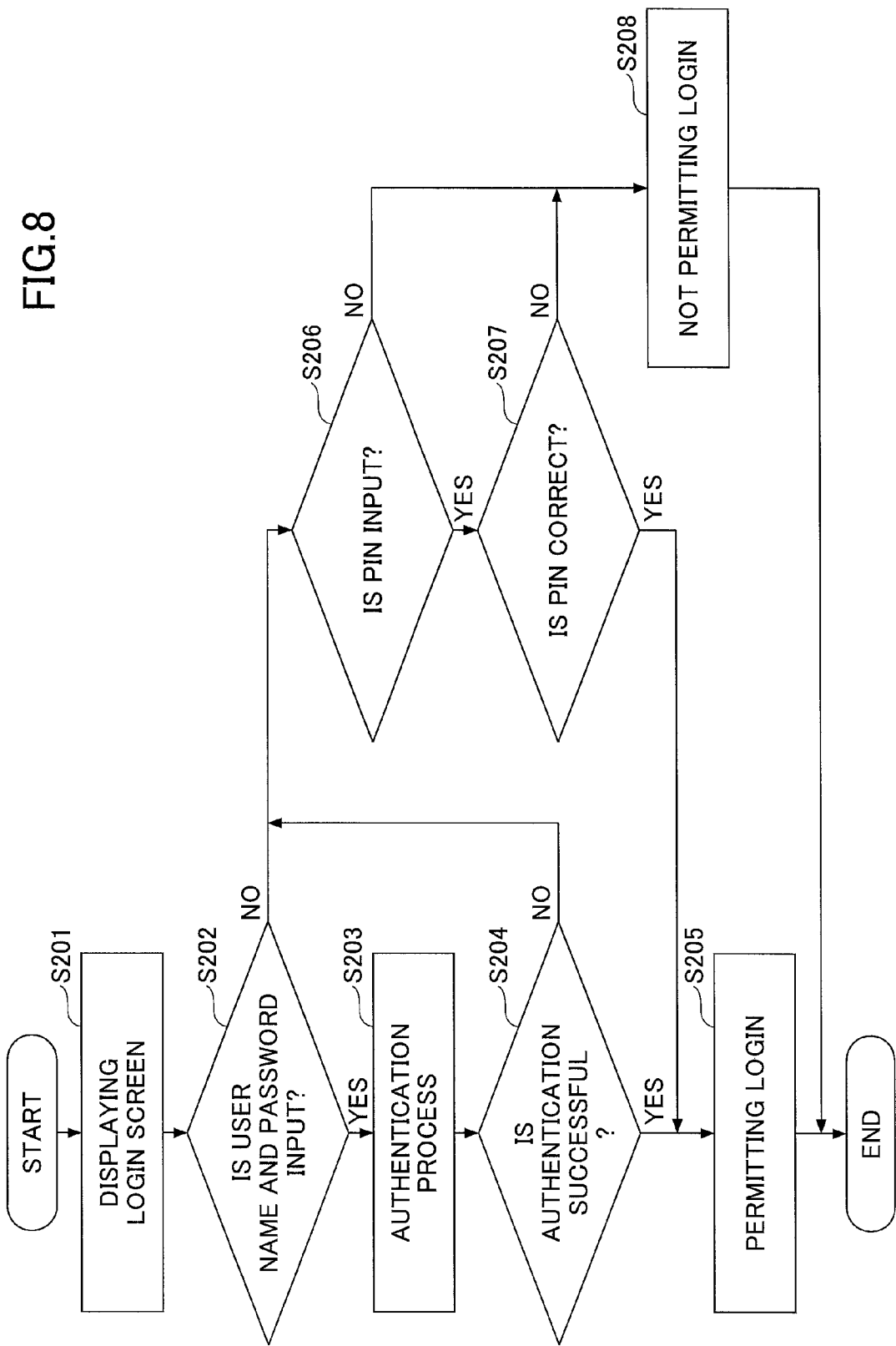
FIG. 8 is a flowchart illustrating an exemplary procedure of a login process of logging in an image forming apparatus.

FIG. 8 is a flowchart illustrating an exemplary procedure of a login process of logging into the image forming apparatus 20.

After starting the image forming apparatus 20 or after a logout of another user, the authentication controlling unit 221 causes a login screen to be displayed on the operation panel 25.

Figure 9:
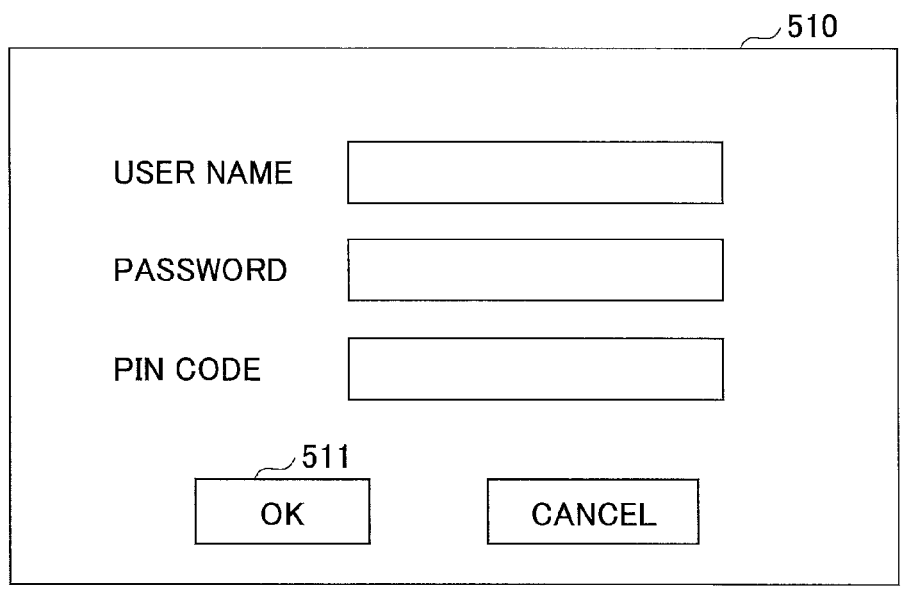
FIG. 9 is an exemplary display of a log-in screen.

FIG. 9 is an exemplary display of the login screen 510. Referring to FIG. 9, the login screen 510 includes an input area for the user name, the password, the PIN code, or the like.

For example, in a case where the operator of the image forming apparatus 20 is the authenticated user, the user name and the password are input in the login screen 510. On the other hand, in a case where the operator is the guest user, the PIN code reported by the response mail or the PIN code reported from the authenticated user is input in the login screen 510.

The authenticated user may input the PIN code. For example, in a case where the authenticated user sends a print request mail from a mail address of a user terminal for private use, which is other than the authenticated address, the PIN code is included in the response mail returned to the user terminal 30. On the other hand, the authenticated user may separately send the access destination register mail from the authenticated address. In this case, as to the authenticated user, the access destination information associated with the PIN code and the access destination information associated with the user name are stored in the access destination memory unit 19. In order to enable jobs concerning these access destination information with one login operation to be performed, the user name with the password and the PIN code may be simultaneously input.

After at least one of the user name with the password and the PIN code is input into the login screen 510 and an OK button 511 is pushed, the authentication controlling unit 221 determines whether the user name and the password are input onto the login screen 510 (S202). In a case where the user name and the password are input (YES of S202), the authentication controlling unit 221 performs an authentication process. Specifically, the authentication controlling unit 221 sends an authentication request, in which the input user name and the password are designated, to the authentication server 50. The request responding unit 51 of the authentication server 50 determines whether the set of the user name and the password designated in the authentication request is stored in the user information memory unit 52. In a case where the set is stored in the user information memory unit 52, authentication is successful. In a case where the set is not stored in the user information memory unit 52, the authentication is failed. The request responding unit 51 sends information indicative of success or failure of the authentication to the authentication controlling unit 221 of the image forming apparatus 20 as the source of the authentication request.

In a case where the authentication is successful (YES of S204), the authentication controlling unit 221 permits the login by the operator and stores the input user name in the RAM 212 as the login information (S205). In addition to the user name and the password related to the successful authentication, the PIN code (if it is input) is included in the login information and stored in the RAM 212. In this case, the operator can cause the image forming apparatus 20 to perform, for example, a scanning delivery job, a copy job, a fax transmission job, a print job, or the like.

On the other hand, in a case where the user name and the password are not input onto the login screen 510 (NO of S202) or a case where the authentication based on the user name and the password has failed (NO of S204), the authentication controlling unit 221 determines whether the PIN code is input onto the login screen 510 (S206). In a case where the PIN code is input (YES of S206), the authentication controlling unit 221 confirms the authenticity of the PIN code (S207). Specifically, if the PIN code is stored in the access destination memory unit 19, the PIN code is determined to be correct. Specifically, if the PIN code is not stored in the access destination memory unit 19, the PIN code is determined to be incorrect. Meanwhile, in a case where the rightful PIN code is stored in the PIN code memory unit 19, the mail address and the authenticated user name, which are stored in association with the PIN code, are acquired from the access destination memory unit 19.

In a case where the input PIN code is correct (YES of S207), the authentication controlling unit 221 permits a login by the operator and stores the PIN code, and the mail address and the authenticated user name corresponding to the PIN code in the RAM 212 as the login information (S205). In this case, for example, the operator can cause the image forming apparatus 20 to perform the scanning delivery job, the copy job, the fax transmission job, the print job, or the like within a range of the authority given to the guest user. It is possible to distinguish whether the user name included in the login information is the authenticated user name acquired based on the PIN code or the user name input through the login screen 510.

On the other hand, in a case where the input PIN code is incorrect (NO of S207), the authentication controlling unit 221 does not permit the login by the operator (S208). In this case, for example, the login screen is maintained to be displayed, and the operator cannot use the image forming apparatus 20.

Further, in a case where the image forming apparatus 20 performs a job in response to the operation by the operator who has successfully logged in, the image forming apparatus 20 may include the login information into log data and record the login information. With this, it is possible to specify the authenticated user who has a responsibility for each job. The user who has the responsibility for the print job is, for example, a user who has to bear the expense for the print job (however, an entity which actually bear the expense may be a department to which the user belongs), a user recorded in association with a log related to the print job, or a user whose account for the print job is added in an environment where the account (the accumulated number of sheets) of the number of printed sheets output for each authenticated user is managed. Further, in a case where the operator is a guest user, the mail address of the guest user is stored in the log data. Then, it is possible to expect a psychological deterrent effect and an improvement in tracking the guest user who has performed the unauthorized use. However, the mail address of the guest user may not always be included in the log data. In this case, the mail address may not be stored in the access destination memory unit 19.

Subsequently, described is a procedure performed by the image forming apparatus 20 when the scanning delivery job is instructed to be executed by the operator who is permitted to log in.

FIG. 10 is a flowchart for explaining an exemplary procedure of an execution process of a scanning delivery job.

In step S301, the access destination acquiring unit 222 determines whether a user name is included in the login information. In a case where the user name is included in the login information (YES of S301), the access destination acquiring unit 222 adds the user name to the designation information (S302). The designation information is information used to acquire the access destination information from the destination memory unit 19 in subsequent step S305.

Subsequently, the access destination acquiring unit 222 determines whether the PIN code is included in the login information (S303). In a case where the PIN code is included in the login information (YES of S303), the access destination acquiring unit 222 adds the PIN code to the designation information (S304).

The access destination acquiring unit 222 acquires the access destination information stored in the access destination memory unit 19 in association with the user name of the login user or the PIN code (S305). For example, if the operator is the authenticated user, the access destination information associated with the user name of the authenticated user is acquired. Further, in a case where the authenticated user inputs the PIN code in addition to the user name and the password, the access destination information associated with the PIN code is acquired. On the other hand, if the operator is the guest user, the access destination information associated with the PIN code input by the guest user is acquired.

Subsequently, the scanning delivery controlling unit 225 causes an operation screen for the scanning delivery job to be displayed on the operation panel 25 (S306). On the operation screen, values related to setup items such as a resolution, a color setup, or the like can be set. Further, the access destination information acquired in step S305 can be displayed as information related to the delivery destination of the scanned image on the operation screen. In a case where the account information (for example, the user name and the password) is required for the online storage system 60 related to the access destination information, the operation screen may include an input area for the account information. In a case where multiple destination information is acquired in step S305, the access destination information which is effective for the job can be selected.

When a setup operation is completed using the operation screen, an original is set, and an instruction of starting scanning is input, the scanning delivery controlling unit 225 causes the scanner to scan the original in the resolution set up on the operation screen or the like (S307). Subsequently, the scanning delivery controlling unit 225 sends or stores the scanned image to or in the delivery destination (for example, a certain folder of the online storage system 60) related to the access destination information acquired in step S305 (S308). At this time, in a case where the account information is necessary for the access to the transmission destination of the scanned image or the access to the storage destination of the scanned image, the account information input on the operation screen is used. Further, the account information may be input in step S308. Further, account information for the access destination may be included in access destination information designated by an access destination register mail. In this case, in the process of FIG. 10, it is unnecessary to request an input of the account information to the user.

Meanwhile, in a case where the operator is the guest user (said differently, in a case where the user name of the operator is not included in the login information), the scanning delivery controlling unit 225 may deliver the scanned image also to the authenticated address. The authenticated address can be acquired from the user information memory unit 52 based on the authenticated user name included in the login information. Because the scanned image delivered to the guest user is also delivered to the authenticated user, a psychological deterrent effect can be given to the guest user to prevent a wrong conduct such as scanning of a classified document in a company A. Further, the delivery destination related to the access destination information of the access destination, to which the scanned image is delivered, may be reported to the authenticated address. Because the authenticated user can confirm where the scanned image is stored, it is possible to prevent the scanned image from being delivered to a delivery destination, which is not desirable for the authenticated user, and from being used.

Subsequently, described is a procedure performed by the image forming apparatus 20 when an execution instruction of the print job is input based on data stored in the online storage system 60 related to the access destination information by the operator whose login is permitted.

FIG. 11 is a flowchart for explaining an exemplary procedure of the execution process of the print job.

In steps S401 to S405, processes similar to steps S301 to S305 are performed by the access destination acquiring unit 222. As a result, the access destination information corresponding to the login user is acquired.

Subsequently, the print object acquiring unit 223 receives an input of the account information to the access destination related to the acquired access destination information from the user (S406). For example, the print object acquiring unit 223 causes a screen for inputting the account information to be displayed on the operation panel 25 and receives the input of the account information through the screen. In a case where the access destination information designated in the access destination register mail includes the account information, step S406 may not be performed.

Subsequently, the print object acquiring unit 223 uses the account information to access the folder or the file of the online storage system 60 indicated by the access destination information and acquire a list (hereinafter, referred to as a "file list") of bibliographic information of the file at the access destination (S407). If the access destination is the folder, the file list inside the folder is acquired. If the access destination is the file, the bibliographic information of the file is acquired as the file list.

Subsequently, the print object acquiring unit 223 causes the file list to be displayed on the operation panel 25 (S408). For example, a list of the file names or the like is displayed on the operation panel 25. If at least one file name is selected from the file list, the print object acquiring unit 223 acquires (downloads) a file corresponding to the file name from the access destination related to the access destination information (S409).

In a case where the access destination information indicates only one file, steps S407 and S408 are not performed and the file may be downloaded.

Subsequently, the print controlling unit 224 controls an execution of the print job related to the data stored in the acquired file (S410). As a result, a paper, on which the print data are printed, is output.

Meanwhile, a certain online storage system 60 includes a converting function of converting data format of a file stored in the certain online storage system. For example, such an online storage system 60 can convert the file stored in the online storage system 60 to a format to be able to be printed by image forming apparatus 20. If the online storage system 60 has such a function, the function may be used. In this case, the image forming apparatus 20 does not need to generate print data such as page description language (PDL) data or the like. Meanwhile, if the online storage system 60 does not have such a function and the file at the access destination has a data format which cannot be printed as is, the image forming apparatus 20 generates the print data for the file.

As described, within the embodiment, it is possible to give a PIN code, which is a temporal and pseudo account, to the guest user who does not have the account. Further, the PIN code differs between the guest users. Therefore, it is possible to improve security between the guest users in comparison with an account used in common by the guest users.

Further, the user can access an arbitrary access destination by the access destination register mail. Therefore, it is possible to cause the image forming apparatus 20 to perform a job using an outer storage such as an online storage system 60.

The access destination related to the access destination information which can be designated in the access destination register mail is not limited to a storage or the like located outside the information processing system 1. For example, the folder or the file inside the auxiliary memory device 102 of the management server 10 or the folder or the file inside the storage connected with the management server 10 by LAN may be designated as the access destination.

Within the above embodiment, described is the example where the register request of registering the access destination is sent in the format of the email and the PIN code is responded in the format of the email. However, a communication unit for the register request of the access destination and the response of the PIN code is not limited to the email. For example, these request and response may be performed using a communication unit such as a Web interface or another communication unit. For example, in a case of the web interface, the destination address of the access destination register mail may be replaced by a specific URL. Further, the transmission source address may be replaced by the IP address of the transmission source of the request. For example, the user information memory unit 52 may store the IP address of the user terminal 30 used by the authenticated user in place of the mail address or together with the mail address. Further, the access destination memory unit 19 may store the IP address of the transmission source of the request in place of the mail address.

Further, within the above embodiments, although the PIN code is explained as the one example of the identification information for identifying the operation authority, the PIN code may be used as identification information for identifying operation authorities of another apparatus such as a projector or a teleconference system.

Furthermore, within the above embodiments, the PIN code is an example of authority identifying information. The access destination information (URL) is an example of the address information. The user name of the authenticated user is an example of user identification information. The mail receiving unit 11 is an example of a receiving unit. The PIN code generating unit 13 is an example of a generating unit. The mail returning unit 16 is an example of a sending unit. The access destination memory unit 19 is an example of a first memory unit. The scanned image is an example of image data input by an apparatus. The user information memory unit 52 is an example of a second memory unit.

An apparatus can be used by a user even if the user does not have the operation authority of the apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information processing system has been described in detail, it should be understood that various changes, substitutions, and alterations could be made thereto without departing from the spirit and scope of the invention.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any recording medium for storing processor readable code such as a floppy disk, hard disk, CD ROM, magnetic tape device or solid state memory device.)

The hardware platform includes any desired hardware resources including, for example, a central processing unit (CPU), a random access memory (RAM), and a hard disk drive (HDD). The CPU may include processors of any desired kinds and numbers. The RAM may include any desired volatile or nonvolatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

This application is based upon and claims the benefit of priority of the prior Japanese Patent Application No. 2013-153546, filed on Jul. 24, 2013, the entire contents of which are incorporated herein by reference.

What is claimed is:

1. An information processing system including at least one computer, the information processing system comprising:
 a first receiving unit that receives a request including address information and user information from a requesting user;
 a first memory unit that stores the address information that is included in the received request;
 a second memory unit that stores the user information;
 a sending unit that sends, to the requesting user, authority identifying information for identifying operation authority of an apparatus in response to receiving the request;
 a registering unit that registers the address information included in the received request in the first memory unit in association with the authority identifying information when the user information included in the received request is stored in the second memory unit, the address information specifying a destination information including at least a folder or a file in a network;
 a second receiving unit that receives the authority identifying information input by the requesting user; and
 a control unit that controls the apparatus to execute a job in response to an instruction by the requesting user, the job including a process of sending data input by the requesting user to the registered address information associated with the authority identifying information input by the requesting user, wherein the control unit is configured to control the apparatus to send a scanned image data that is scanned by an image forming apparatus to the registered address information associated with the authority identifying information input by the requesting user when the requesting user inputs the authority identifying information.

2. The information processing system according to claim 1, further comprising:
a generating unit that generates authority identifying information,
wherein the receiving unit receives the request including user information, the user information including first user information of the requesting user and second user information of another user;
the generating unit generates the authority identifying information in a case where the first user information included in the received request is not stored in the second memory,
the sending unit sends the authority identifying information when the authority identifying information is generated by the generating unit, and
the registering unit registers the address information in the first memory unit in association with the authority identifying information when the first user information included in the received request is not stored and the second user information included in the received request is stored in the second memory unit.

3. The information processing system according to claim 2, wherein the receiving unit receives email as the request, the first user information including a transmission source address of the email, the second user information including another address of the email and the address information designated by the user of the first user information.

4. The information processing system according to claim 2,
wherein the receiving unit receives the request including user information, said user information including the first user information and not including the second user information;
the sending unit does not send the authority identifying information when the first user information included in the received request is stored in the second memory, and
the registering unit registers the address information in the first memory unit in association with the user identification information of the requesting user stored in the second memory when the first user information included in the received request is stored in the second memory unit.

5. The information processing system according to claim 1,
wherein the job includes printing data acquired from the registered address information.

6. The information processing system according to claim 1,
wherein the job includes sending out data to the registered address information acquired from the registered address information.

7. A method of processing information performed by an information processing system including at least one computer, the method of processing information comprising:
first receiving a request including address information and user information from a user;
storing the address information that is included in the received request in a first memory;
storing the user information in a second memory;
sending, to the requesting user, authority identifying information for identifying operation authority of an apparatus in response to receiving the request;
registering the address information included in the received request in the first memory unit in association with the authority identifying information when the user information included in the received request is stored in the second memory unit, the address information specifying a destination information including at least a folder or a file in a network;
receiving the authority identifying information input by the requesting user; and
controlling the apparatus to execute a job in response to an instruction by the user, the job including a process of sending data input by the requesting user to the registered address information associated with the authority identifying information input by the requesting user,
wherein the control step controls the apparatus to send a scanned image data that is scanned by an image forming apparatus to the registered address information associated with the authority identifying information input by the requesting user when the requesting user inputs the authority identifying information.

8. The method of processing the information according to claim 7,
further comprising generating authority identifying information,
wherein the receiving receives the request including user information, the user information including first user information of the requesting user and second user information of an another user;
the generating generates the authority identifying information in a case where the first user information included in the received request is not stored in the second memory,
the sending sends the authority identifying information when the authority identifying information is generated by the generating, and
the registering registers the address information in the first memory unit in association with the authority identifying information when the first user information included in the received request is not stored and the second user information included in the received request is stored in the second memory unit.

9. The method of processing the information according to claim 8,
wherein the receiving receives the request including user information, said user information including the first user information and not including the second user information;
the sending does not send the authority identifying information when the first user information included in the received request is stored in the second memory, and
the registering registers the address information in the first memory unit in association with the user identification information of the requesting user stored in the second memory when the first user information included in the received request is stored in the second memory unit.

10. The method of processing the information according to claim 7,
wherein the job includes printing data acquired from the registered address information.

11. The method of processing the information according to claim 7, wherein the job includes sending out data to the registered address information acquired from the registered address information.

12. A non-transitory computer-readable storage medium storing a program having a sequence of instructions, when executed by a computer included in an information processing system, causing the computer to perform:
 first receiving a request including address information and user information from a user;
 storing the address information that is included in the received request in a first memory;
 storing the user information in a second memory;
 sending, to the requesting user, authority identifying information for identifying operation authority of an apparatus in response to receiving the request;
 registering the address information included in the received request in the first memory unit in association with the authority identifying information when the user information included in the received request is stored in the second memory unit, the address information specifying a destination information including at least a folder or a file in a network;
 receiving the authority identifying information input by the requesting user; and
 controlling the apparatus to execute a job in response to an instruction by the user, the job including a process of sending data input by the requesting user to the registered address information associated with the authority identifying information input by the requesting user,
 wherein the control step controls the apparatus to send a scanned image data that is scanned by an image forming apparatus to the registered address information associated with the authority identifying information input by the requesting user when the requesting user inputs the authority identifying information.

13. The non-transitory computer-readable storage medium according to claim 12,
 further comprising:
 generating authority identifying information,
 wherein the receiving receives the request including user information, the user information including first user information of the requesting user and second user information of an another user;
 the generating generates the authority identifying information in a case where the first user information included in the received request is not stored in the second memory,
 the sending sends the authority identifying information when the authority identifying information is generated by the generating, and
 the registering registers the address information in the first memory unit in association with the authority identifying information when the first user information included in the received request is not stored and the second user information included in the received request is stored in the second memory unit.

14. The non-transitory computer-readable storage medium according to claim 13,
 wherein the receiving receives the request including user information, said user information including the first user information and not including the second user information;
 the sending does not send the authority identifying information when the first user information included in the received request is stored in the second memory, and
 the registering registers the address information in the first memory unit in association with the user identification information of the requesting user stored in the second memory when the first user information included in the received request is stored in the second memory unit.

15. The non-transitory computer-readable storage medium according to claim 12,
 wherein the job includes printing data acquired from the registered address information.

16. The non-transitory computer-readable storage medium according to claim 12,
 wherein the job includes sending out data to the registered address information acquired from the registered address information.

* * * * *